United States Patent [19]
Conrad et al.

[11] Patent Number: 5,209,078
[45] Date of Patent: May 11, 1993

[54] VACUUM FLUID COOLING APPARATUS

[76] Inventors: Wayne E. Conrad, 27 King Street, Hampton, Ontario, Canada, L0B 1J0; Richard S. Phillips, 24 Devondale St., Courtice, Ontario, Canada, L1E 1S1; Andrew R. Phillips, 584 Bloor Street East, Oshawa, Ontario, Canada, L1H 3N2

[21] Appl. No.: 746,348

[22] Filed: Aug. 16, 1991

[51] Int. Cl.$^5$ ............................................. F25B 19/00
[52] U.S. Cl. ........................................ 62/169; 62/268; 62/305; 137/62
[58] Field of Search ................ 62/169, 268, 304, 305; 137/62; 126/420

[56] References Cited

U.S. PATENT DOCUMENTS

| | | | |
|---|---|---|---|
| 2,050,516 | 8/1936 | Woodward | 62/169 |
| 2,233,249 | 2/1941 | Downs | 62/169 |
| 3,362,186 | 1/1968 | Patterson | 62/304 |
| 3,800,553 | 4/1974 | Engalitcheff, Jr. | 62/305 |
| 4,557,252 | 12/1985 | Dinh | 137/62 |

FOREIGN PATENT DOCUMENTS 1261628 9/1989 Canada .

Primary Examiner—John Sollecito

[57] ABSTRACT

An air cooler system for use in association with an air circulation system and having a process air heat exchanger for recovering heat from the process air in the system, a vacuum chamber with a vacuum chamber heat exchanger in communication with the process air heat exchanger so as to transfer heat from process air heat exchanger to the vacuum chamber heat exchanger, a water supply for supplying water to the vacuum chamber and, vacuum source to draw a predetermined degree of vacuum in the vacuum chamber so as to reduce the boiling point of water therein.

5 Claims, 4 Drawing Sheets

VACUUM FLUID COOLING APPARATUS

FIELD OF THE INVENTION

The invention relates to a fluid cooling apparatus, and in particular to an apparatus for cooling gaseous fluids such as air and to a method of cooling fluids.

BACKGROUND OF THE INVENTION

The cooling of gaseous fluids and, in particular, the cooling of air is required in many circumstances. Cooling ambient atmosphere is required in buildings, domestic dwellings, and in appliances such as refrigerators, and in storage rooms and the like. It is also, of course, required in vehicles such as automobiles and many delivery vehicles and trucks, and in aircraft and marine craft.

Many different proposals have been made for cooling gases and, in particular, for the cooling of air. The most popular system in widespread use is the use of the compression and expansion of a heat exchange medium in the form of a gas which can be compressed into a liquid state, and then is allowed to expand into a vapour state once more, the so-called compression/expansion cycle. In most cases, the gas used is known under the trade mark "Freon". These systems using the compression-/expansion cycle require a relatively large input of power for the compression cycle. This is usually provided by a pump, and an electrical motor or other prime mover. For example, in the case of an automobile, a power takeoff is simply connected directly to the automobile engine usually by means of a belt.

In most other cases, electrical motors are used as is well known. These systems require more and more power, as the cooling load is increased. Thus, in extremely hot seasons of the year, very large amounts of electrical power are required simply to maintain a stable cool environment in office buildings and homes and elsewhere. Similarly, in the case of automobiles, during the summer months, it is well known that the operation of an automobile air conditioner for maintaining cool air within the automobile, places a substantial load on the engine and increases the fuel consumption considerably.

Since electrical power is generated largely by the use of fossil fuels, and since automobiles are almost entirely powered by fossil fuels, it will be appreciated that the amount of fuel expended simply to cool interior environments, during the hot weather, is very considerable. This fuel consumption can sometimes be so great as to impair the air quality of the ambient air, and can, in some cases, actually threaten the stability of the electrical power supply utility itself.

A further and more significant disadvantage of the compression expansion gas cycle heat exchanger is the fact that, as in the case of almost all mechanical devices, it eventually wears out, and the seals entrapping the gas within the closed circuit compression/expansion loop become worn. As a result, the gas is allowed to escape into the atmosphere. It is now widely believed that the escape of such gases into the upper atmosphere of the earth is responsible for certain changes in the upper atmosphere which are likely to have long term serious and harmful effects for the entire population of the earth.

Other forms of heat exchange cycle devices are used in commercial buildings. These usually simply involve water chillers, and a water circulation system whereby chilled water is pumped through the radiators in a commercial building, during the hot season. Heat exchangers and evaporators are usually located, for example, on the roof of a building. These systems while, generally speaking, being less harmful in terms of releasing gases into the atmosphere, still require the consumption of substantial amounts of electrical power in most cases.

Other systems which have been used in the past are the so-called "ammonia" cycle cooling system and also the "lithium-bromide" cooling cycle. Both of these systems also make use of the physical properties of the chemical involved, which goes through a change of state, during the cycle and thus transfers heat from an enclosed space, to some other point where it may be dissipated into the atmosphere. While these systems are somewhat less harmful than the conventional "Freon" (trade mark) cycle systems, they are also known to be somewhat less efficient and thus do not produce the same cooling efficiency, and are consequently not as popular with consumers.

As a result, notwithstanding all of the well known disadvantages of the typical "Freon" compression expansion heat exchange cycle, the "Freon" gas heat exchanger is by far the most widely used method of heat exchange, in use at the present time.

Clearly, it is desirable to provide a heat exchange system wherein both problems are overcome. Ideally such a heat exchange system should be characterized by a complete absence of any harmful pollutants which can escape from the system and, at the same time, should use as a little as possible in the way of energy input required to operate them.

Since, in many situations, heat exchangers are required where there is already an excess of "waste" heat, it is clearly desirable, if possible, that any power requirements required for the operation of such a heat exchanger shall be generated by recycling waste heat. This is particularly true, for example, in the automobile industry. In this particular case, it is clearly desirable, as far as possible, to provide a heat exchanger which does not draw energy from the prime mover, but instead depends for its energy source on waste heat generated by the prime mover which is otherwise simply vented to atmosphere either through the exhaust system or through the engine coolant system.

In the particular case of the automobile industry, the designing of a high efficiency heat exchanger, which does not utilize harmful pollutants, is particularly desirable for another reason. In recent years, governments, in various countries, have attempted to discourage the installation of air conditioners in automobiles. Governments have been motivated by various reasons, other than the simple extraction of tax revenues. In the first place, such heat exchangers eventually leak and vent harmful pollutants to the atmosphere and, in the second place, they cause excess consumption of fossil fuels. These cause undesirable emissions to the atmosphere and, in the case of some countries, use up precious foreign exchange resources, which would better be used for the purchasing of other forms of supplies, unobtainable in those countries.

In some countries, therefore, a special air conditioner tax has been adopted. This tax must be paid when a new vehicle is obtained incorporating the air conditioning in its ventilation system.

Clearly, therefore, it is desirable from all points of view to provide a different form of air conditioning for automobiles which does not offend any government regulations and does not involve or incur the payment of additional taxes.

A further factor in the design of such an improved air conditioner is that there exists a very substantial market in the automobile industry and, in particular, in the commercial side of the automobile industry, i.e., commercial vehicles and trucks, for the retrofitting of air conditioners to vehicle ventilation systems. This arises both in the case of older cars which have not been built with air conditioners. However, it also applies in the case of newer smaller horsepower vehicle sold at the lower end of the price range, where the air conditioner tax is a significant discouragement to the consumer and, in addition, where the operation of an air conditioner on a relatively lower horsepower vehicle would substantially interfere with its performance.

In the commercial vehicle industry on the other hand, air conditioners are often not specified in the ventilation systems due to the penalty of an increase in fuel consumption. Such commercial vehicles which are operated over many hundreds of thousands of miles a year, must be operated with a predictable rate of fuel consumption. If air conditioners are incorporated in such vehicles, and the fuel consumption increases, then it significantly interferes with the economics of the operation of such a vehicle. As a result, there has been considerable resistance to the installation of air conditioners in such commercial vehicles.

This "after market" for air conditioners which can be retrofitted into existing vehicles is very substantial However, existing vehicle air conditioners based on the "Freon" cycle of compression and expansion cannot easily be retrofitted and, in addition, even if they are, require the payment of the air conditioner tax in those jurisdictions where it is applicable, and also reduce vehicle performance.

Clearly, therefore, it is desirable that in the design of a new air conditioning cycle that it shall be capable of being retrofitted into vehicle ventilation systems which do not already have air conditioning systems, and that it may have such a design that it does not incur the air conditioning tax or other penalties in certain jurisdictions, and that it does not emit harmful pollutants or use fossil fuels to any extent.

BRIEF SUMMARY OF THE INVENTION

With a view to satisfying the foregoing various conflicting requirements, the invention comprises an air cooler system for use in association with an air circulation system and having a process air heat exchanger adapted to be mounted in said air circulation system for recovering heat from process air in said system an air cooler system for use in association with an air circulation system and comprising an air circulation heat exchanger adapted to be mounted in said air circulation system for recovering heat from said system, vacuum chamber means, a vacuum chamber heat exchanger comprising a plurality of generally parallel spaced horizontal radiator tubes extending between first and second header tank means and heat exchange fins mounted on said tubes located within said vacuum chamber means and in fluid communication with said air circulation heat exchanger means, a water supply tank, and means connecting said water supply tank to said vacuum chamber means, fluid circulation means for circulating heat exchange fluid from said air circulation heat exchanger to said one of said first and second header tank means and back again from the other of said header tank means whereby to transfer heat from said air circulation heat exchanger through said tubes of said vacuum chamber heat exchanger, a belt formed of a liquid evaporation media placed around said vacuum chamber radiator tubes and fins and extending from a lower region to an upper region of said vacuum chamber means, said belt in said lower region being normally immersed in water, and said belt in said upper region being normally above said water whereby water within said lower region of said chamber may permeate said media, and substantially surround at least a portion of said radiator tubes and fins, water distributor means for distributing water within said vacuum chamber means, for wetting said liquid evaporation belt, sensing means for sensing a predetermined level of water in said vacuum chamber means, control means for controlling flow of water from said water supply tank to said vacuum chamber means, whereby to maintaining same said predetermined level of water therein, exposing a portion of said evaporation media above said level, vacuum source means, adapted to operate to draw a predetermined degree of vacuum in said vacuum chamber means, whereby to effectively reduce the boiling point of water therein, and, whereby water may be continuously vaporised from said belt of evaporation media, above said water level, thereby drawing water up from said lower region of said chamber means, around said radiator tubes and fins, and cooling the same by extracting the latent heat of vaporisation of water from said fins and tubes.

The invention further comprises such an air cooler system, and including thermal insulation means, around said vacuum chamber, and a secondary vacuum chamber therearound to reduce heat gain in said first vacuum chamber.

The invention further comprises such an air cooler system and including a liquid vapour condenser means coupled to said vacuum source whereby to recondense vapour evacuated from said vacuum chamber by said vacuum source, and means whereby condensed liquid may be returned therefrom back to said liquid supply means.

The invention further comprises such an air cooler system and including a power operated means for driving at least one of said vacuum source means and said fluid circulation means, and, pressure fluid generation means adapted to be connected to an internal combustion engine or other heat source, whereby to recover waste heat and generate pressure fluid for driving of said at least one of said vacuum source and said fluid circulation means. Such pressure fluid may also be used to operate other power operated systems.

The invention further comprises such an air cooler system and wherein said vacuum source is selected from one of a vacuum pump, and the inlet manifold of an internal combustion engine.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
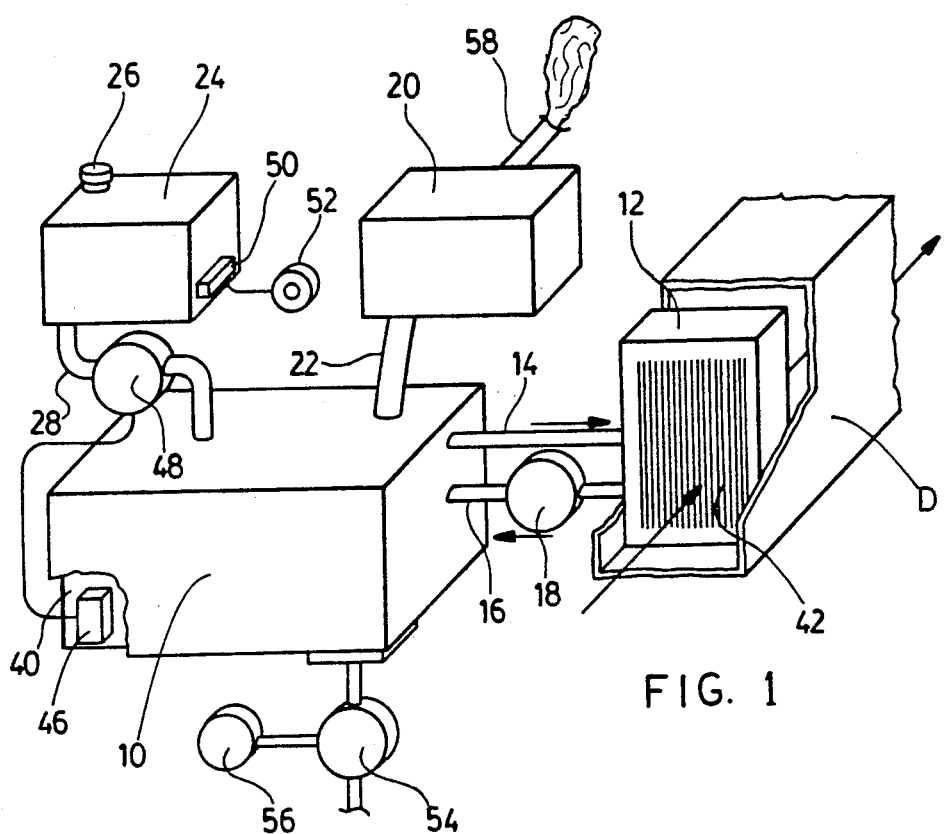
FIG. 1 is a schematic perspective illustration showing a cooler system in accordance with the invention.

Referring first of all to FIG. 1, it will be seen that this preferred embodiment of the invention is illustrated here in the form of a vehicle type air conditioner. However, it will be appreciated as the following description proceeds that the invention is not restricted solely to a vehicle type air conditioner, but has uses other than for cooling air and may be used in other locations.

This description of the air conditioner in a vehicle environment is, therefore, purely by way of example and for the sake of illustration, and without limitation on the scope of the invention.

Referring now to FIG. 1, it will be seen that the invention which is illustrated there in schematic form comprises a liquid condenser-chiller unit 10, a liquid-to-air heat exchanger 12 located in an air circulation duct D and connected to the chiller condenser 10 by means of pipes 14 and 16 and pump 18. Vacuum source 20 is connected to the chiller condenser 10 by pipe 22. Typically vacuum source 20 will be a vacuum pump operated by a power source (not shown).

A water tank or reservoir 24 is indicated having a filler cap 26 and, being connected to the chiller condenser 10 by pipe 28 for supplying water thereto for reasons to be described below.

Figure 2:
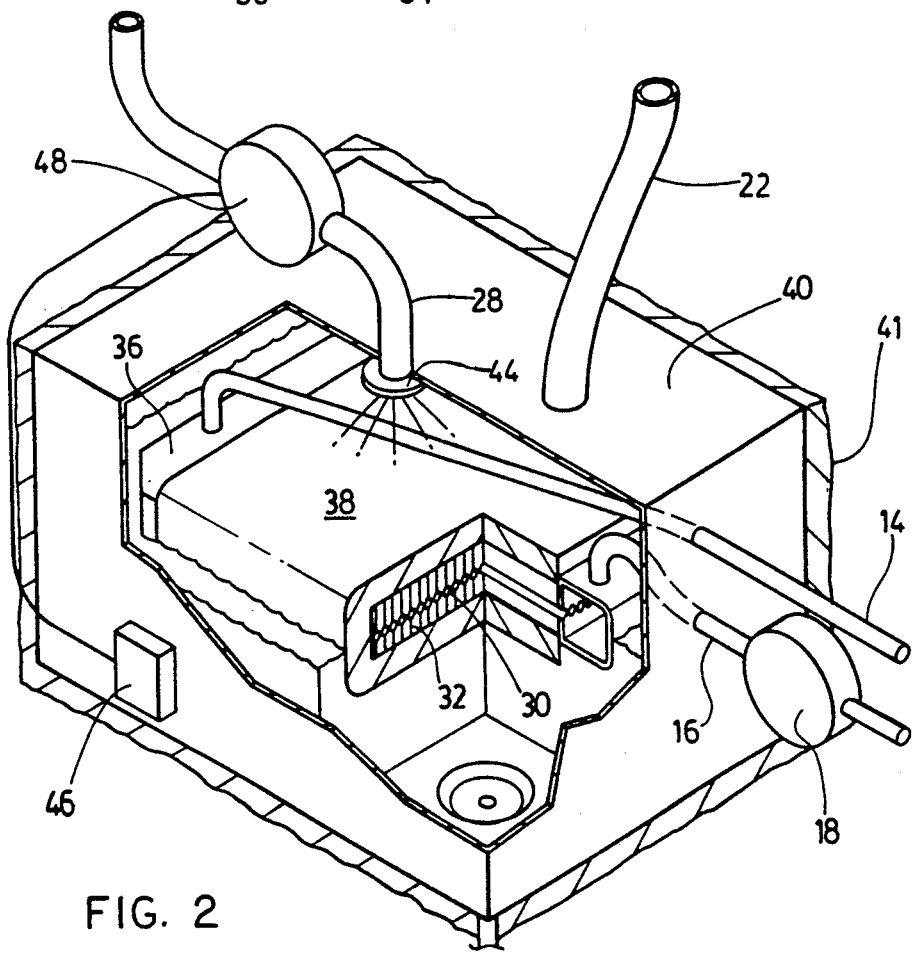
FIG. 2 is an enlarged perspective illustration partially cut away of a portion of the vacuum chamber portion of FIG. 1.

Referring now to FIG. 2, the construction of the chiller condenser unit 10 is illustrated in more detail.

It will be seen to comprise a plurality of parallel spaced apart heat exchanger tubes 30—30 preferably having secured thereto in any suitable manner a plurality of heat exchange fins 32—32 for dissipating heat therefrom.

The tubes 30 are located in a generally horizontal position and are connected to a pair of headers 34-36 at opposite ends, which supply liquid to one end of the tubes and return liquid from the other end of the tubes.

A suitable belt of a liquid permeable evaporator medium 38 surrounds the tubes and fins. In the present embodiment, the evaporator medium 38 would simply be a form of water absorbent sponge material typically being synthetic plastic such as polyurethane foam material.

The entire assembly of tubes, and fins, with the medium 38, is enclosed within a sealed chamber 40, which is vacuum-tight. Preferably it is insulated as at 41, for improved efficiency.

A liquid heat exchange medium is supplied to header 34, by means of pipe 16 and pump 18. The liquid heat exchange medium is drawn off from the other header 36 by pipe 14 after flowing through tubes 30.

In order to chill the liquid flowing through the two headers and the tubes, water, is supplied to the interior of chamber 40, by means of pipe 28.

It will thus be seen that by the operation of the vacuum source 20, the pressure within the chamber 40 may be reduced significantly. Such a reduction in pressure will, in accordance with the invention, reduce the boiling point of the water supplied to chamber 40, to a suitable range for the purposes of the invention as will be explained below.

It will be appreciated that as the water is vaporized, it will draw the latent heat of vaporization from the tubes 30 and fins 32 thereby chilling the liquid medium flowing in those tubes 30.

The chilled liquid medium in the tubes 30 is cycled through the heat exchanger 12 by means of tubes 14 and 16 as explained above.

The heat exchanger 12 is of such a shape and design that it may readily be incorporated in the ventilation system of, for example, a duct D of a vehicle or the like, in this particular embodiment. However, as explained above, the invention is not restricted solely to the incorporation of such a heat exchange system in a vehicle, but it is of much wider application and may cool air, or other gaseous fluid.

As the process air circulating in the ventilation system passes through the heat exchanger 12, e.g., by means of duct D, it will pass around a plurality of tubes and fins indicated generally as 42 in that heat exchanger 12. The liquid medium flowing in those tubes will previously have been chilled, in the evaporator chiller chamber 40. Consequently, the process air will thus be chilled, providing a cooling or air conditioning effect.

The water vapour exhausted by vacuum pump 20 from chamber 40 may simply be allowed to vent to atmosphere via vent pipe 4. The liquid supplied to the chamber 40 being water, will consequently not have any potential for pollution.

Water can be supplied to the chamber 40 by means of a liquid supply tank 24 and pipe 28 already referred to. A distributor device 44 can distribute such water within chamber 40 around the tubes and fins enclosed thereby and around the belt of media 38.

A liquid level sensor 46 on the chamber 40 is adapted to sense the level of water within the chamber. A valve or other control such as an intermettently operable pump or the like indicated generally as 48, in pipe 28 is adapted to control the supply of water from pipe 28 to device 44.

Typically, for example, in the operation of an automobile, the tank 24 might hold one or two gallons of water, and might be required to be topped up once a week or once every two weeks depending upon the degree of usage of the vehicle, and the ambient temperature and weather conditions.

A suitable sensor 50 may be connected to detect when the water level reaches a low point, and a warning light 52 may be connected thereto, to be installed in the vehicle driving compartment, so as to give a visual warning that further water is required.

Since, for descriptive purposes only, the present embodiment is intended for use in vehicles, provision will usually be made for operation of the vehicle in cold climates. For this purpose, the liquid medium flowing in the tubes 30 of the chiller condenser 10 and the air to liquid heat exchanger 12, which is flowing in a closed circuit, operated by a pump 18, will preferably be similar to the coolant already used in vehicle radiators, i.e., will consist either partially or even entirely, in some cases, of ethylene glycol or other anti-freeze, so that it will withstand extreme low temperatures.

It will, of course, be appreciated however that the water in the tank 24 and chamber 40 which may be being vented to atmosphere will not incorporate any such "anti-freeze" formulation.

Since the evaporative liquid is plain water, there will be no objection to the venting of plain water vapour to atmosphere, since it can have no harmful effects.

Accordingly, in this part of the system, precautions against freezing are incorporated including a drain valve 54, which is preferably automatically operated by a temperature sensitive valve operation means 56. This may simply be in the form of a typical bi-metallic strip or the like such as is well known in the art. However, numerous other forms of more sophisticated valve operating devices are known, and may be used, the details of which are well known to persons skilled in the art and require no separate description.

By means of the drain valve and the temperature sensor, the temperature sensor will sense when the temperature drops to a critical level, say in the region of 50 degrees F or less, and will then operate to open the valve. All of the water in the tank 24, pipe 28 and chiller condenser chamber 40 will then drain out, and the system will remain empty of plain water, until warmer weather returns. At that time, the valve will close of its own accord, and all that is required is to simply refill the tank 24 with water, for the system to become operative once more.

As shown in FIG. 2, the chiller/condenser 10 is of rectangular shape. This however is purely for the purposes of illustration and simplicity of drawing. It will be understood, for reasons which will be apparent that shapes other than rectangular will generally speaking be found to be more suitable for this particular container to withstand implosion forces.

The water evaporator medium 38 is of generally belt like shape, would around the tubes 30 and fins 32. Preferably, the evaporator medium would be any suitable form of sponge, which could soak up water, and from which water may be readily evaporated. It will of course be appreciated that there are a wide variety of media which will perform in this way, including both synthetic materials such as polyurethane foam materials, natural sponge materials, glass materials both woven and unwoven, and also some ceramic materials and natural fibres e.g. cotton may also be used for this purpose. It is not intended that this list of materials suitable for such a media shall be in any way exhaustive of such media, and the invention is intended to encompass any media adapted to perform in the manner described below.

It will now be observed that the evaporator belt 38 extends around the horizontal tubes, and their fins from the lower region of the chamber to the upper region. The lower region of the belt will be normally immersed in water, which partially fills the chamber. As stated tubes are horizontal, and the fins vertical so that a portion of the tubes 30 and fins 32 will be located above the water level. They will however be constantly subjected to the wetting action both of the water from distributor head 44, and the belt media 38 due to the effect of surface tension of the water. As water is evaporated from the portion of the belt 38 above the surface of the water, further water would be drawn upwards from the remainder of the belt which would be under water.

The operation of the vacuum source will be such as to produce a significant reduction in the pressure within the chamber. Typically the pressure within the chamber will be reduced to approximately 2 inches of mercury (for example about 1 to 2 inches PSIA). At this reduced pressure, the boiling point of water is substantially reduced, to somewhere in the region of between 45 degrees F. and 55 degrees F.

At the same time, the circulation of the heat exchange fluid by means of the pump 18 through the tubes 30 within the chamber will add thermal energy to the water.

As a result both of the reduced pressure, and the added thermal energy, the water in the chamber 40 will be continuously evaporated.

As is well known, in accordance with established physical principles, as water evaporates, it takes up the so called "latent heat of vaporization" from its surroundings. In this case the latent heat of vaporization will thus be extracted from the tubes 30 and fins 32.

This will thus chill the incoming heat exchange fluid so that cold heat exchange fluid exits through pipe 14.

In accordance with the simplest embodiment of the invention, the vacuum source may simply be a vacuum pump of any suitable design the details of which are not shown here. Its exhaust or vent 58 may simply be vented to atmosphere. No pollution or harmful results will occur. All that will take place is the release of a certain quantity of water vapour.

Naturally this will consume a certain quantity of water from the water supply tank 24. This will then have to be topped up perhaps on a weekly basis, in order to maintain an adequate supply of water for the air conditioner system to function.

Figure 3:
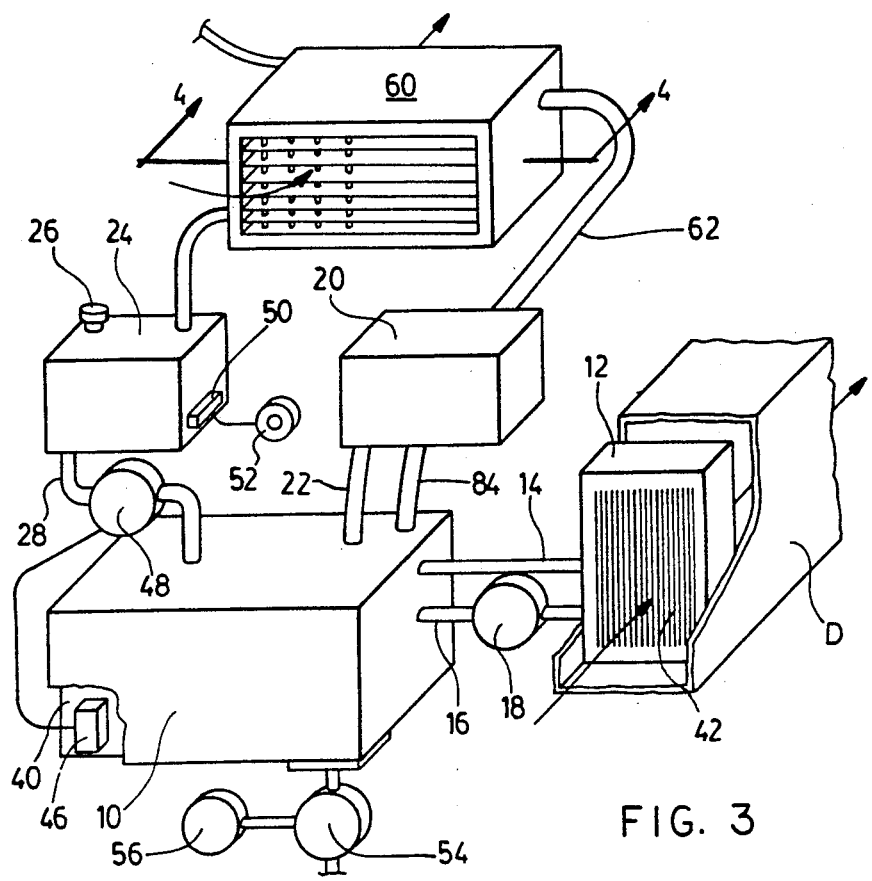
FIG. 3 is a schematic perspective illustration of an alternate embodiment of the invention.

In accordance with a further embodiment (FIG. 3) of the invention, the vacuum chamber and evaporative liquid may form a closed circuit system. In this embodiment the vacuum source, i.e. a pump, may be connected to a radiator condenser unit 60 by pipe 62.

Figure 5:
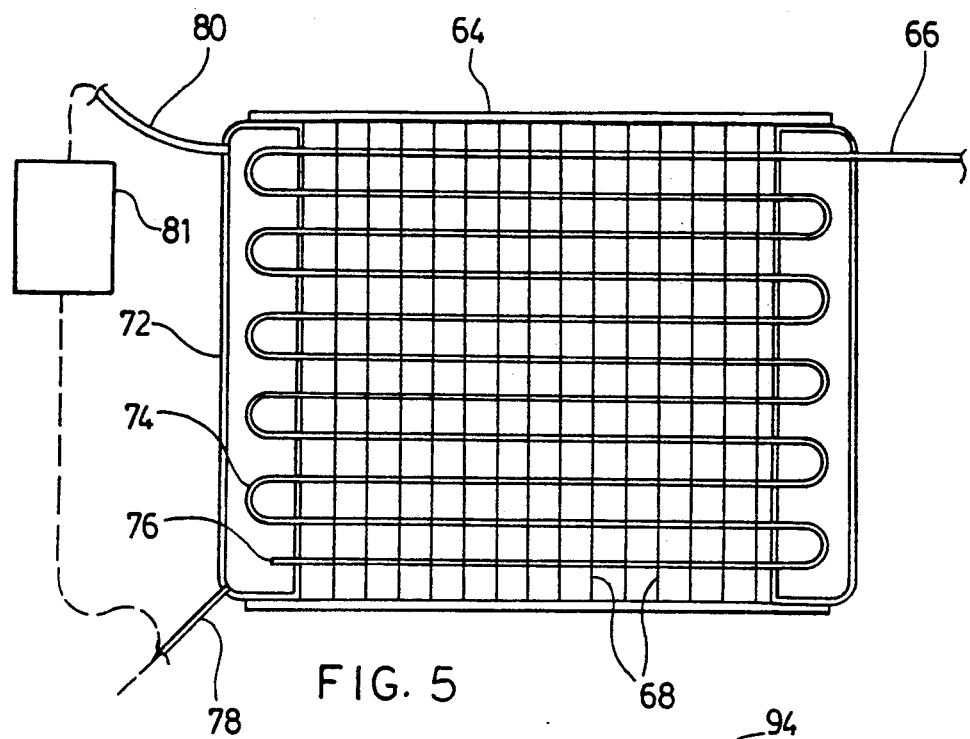
FIG. 5 is a partially cut-away perspective illustration of the vacuum chamber portion of the embodiment of FIG. 3, corresponding to FIG. 2.

The radiator-condenser simply consists of a frame 64 containing a radiator for example made up of tubes 66 fins 68 and headers 70-72 (FIG. 5).

Preferably, the tubes 66 are connected by U bends 74 at each end, so as to define a more or less continuous sinusoidal flow path of the vapour through the radiator. The radiator tubes and fins are exposed to ambient air.

The water vapour exiting from the vacuum pump 20 will have returned to atmospheric pressure and thus contracted in volume, and will flow into the tubes 66 of the radiator/condenser 60. As it does so, its change in pressure and volume will cause it to attempt to condense again. In accordance with well known physical principles as water vapour condenses into liquid water, it must give up its latent heat of vaporization, in order to change into the liquid phase.

As the vapour circulates through the tubes 66 in the radiator, heat will be extracted from the water vapour, and thus released to the ambient atmosphere. In practice only a few degrees of temperature differential is required, in order to condense a substantial percentage of the water vapour back into the water.

The condensed water will exit from the free end of the 76 of the tube 66, into header 72. Any remaining water vapour which has not been condensed will also be contained within the header 72.

Recondensed water can then flow, either by mechanical means or by means of gravity in the pipe 78, and any remaining water vapour can be vented to atmosphere through vent 80.

This condensed water (or other liquid) will then be returned to the supply tank 24.

This regenerative condensation system will provide an essentially closed loop system and will thus greatly reduce the frequency with which the water tank must be topped up.

Figure 4:
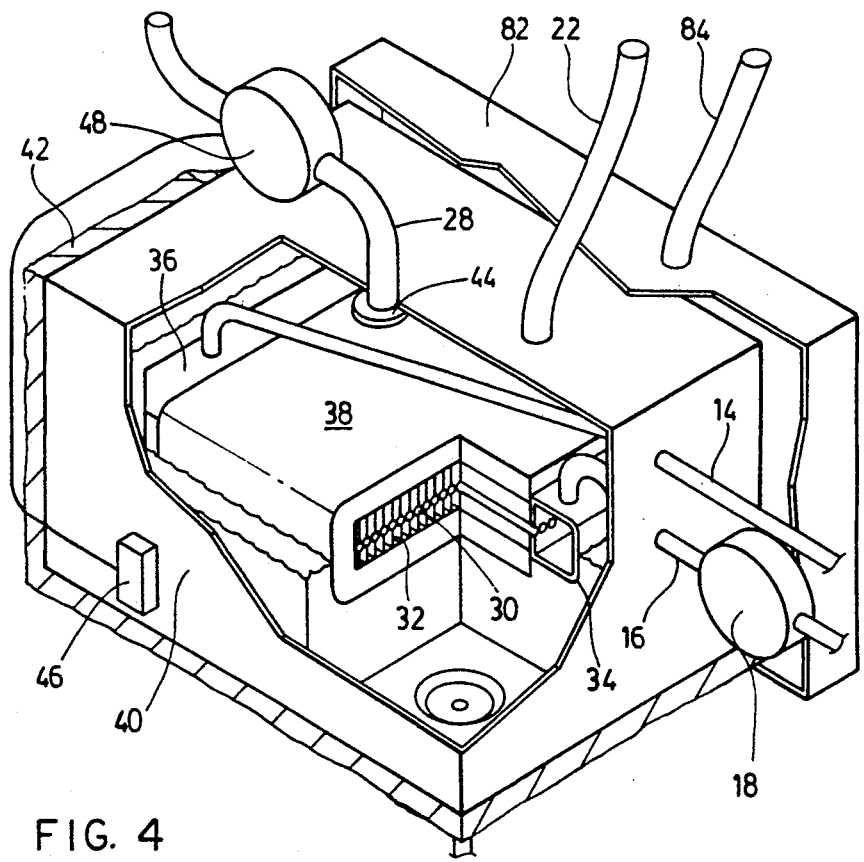
FIG. 4 is a schematic section of the condenser along the line 4—4 of FIG. 3.

In order to still further increase the efficiency of this system, the chiller/condenser chamber 40 which is itself insulated by insulation 42 may be further isolated from the ambient atmosphere by means of an exterior chamber 82, (FIG. 4) which may in turn be separately connected to vacuum source 20 by pipe 84. In this way a vacuum is drawn within the chamber 82, which further reduces the heat transfer from the ambient atmosphere into the chamber 40 and thus increases the efficiency of the system.

Figure 6:
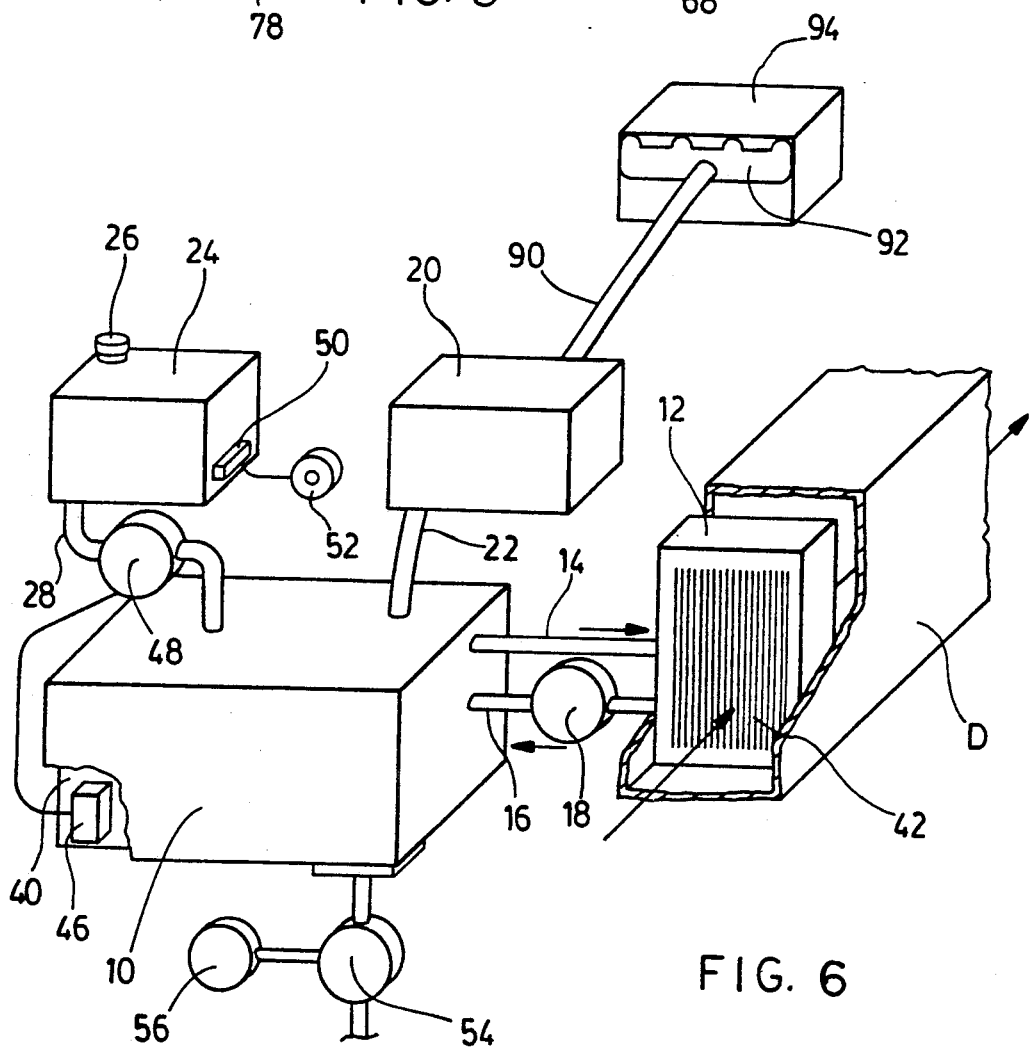
FIG. 6 is a schematic perspective illustration of a still further embodiment of the invention, and, FIG. 7 is a schematic perspective illustration of a still further embodiment of the invention.

In accordance with a still further embodiment of the invention (FIG. 6) the water vapour exiting from the vacuum source may be redirected by pipe 90 into the engine manifold 92 of the engine 94 of the vehicle, assuming that the air conditioner is mounted in a vehicle.

As is well known, the addition of a certain quantity of water vapour to the air/gasoline mixture in the inlet manifold of a gasoline engine will increase its efficiency, and increase the miles driven, up to a point, for a given quantity of gasoline.

This therefore is a highly desirable result, and would itself be a sufficient justification for venting the water vapour to the manifold.

However, there is an additional advantage resulting from this feature. The inlet manifold of an internal combustion engine itself is at a negative pressure, caused by the inlet strokes of the pistons in the engine. This low pressure is utilized in vehicles in a variety of ways, typically as a vacuum source for braking and the like and other servo systems in some makes of vehicles.

However, in the present embodiment, the presence of the vacuum in the inlet manifold, may itself be sufficient to enable the system to operate without the use of an independent vacuum pump, or may augment the effect of such a pump to increase the vacuum.

In this way, both the cost of producing and installing a vacuum pump, and also the relatively small power requirement which the operation of such a vacuum pump would consume from the engine, may both be either eliminated or at least reduced.

Normally, the vacuum pump would be operated for example by a drive belt system driving directly of the crank shaft, or some other belt driven accessory, on the engine. Such a belt driven vacuum pump is therefore regarded as self-explanatory and is not separately illustrated.

However, it will be appreciated that there are other ways in which such a vacuum pump may be operated. For example, it might be operated by means of an electrical motor (not shown) powered by the electrical system on the vehicle. Again however this is a relatively speaking expensive way of operating such a vacuum pump and also does place a slight drain on the power from the engine, and, if used for prolonged periods of time particularly at night, when other electrical accessories are in use on the automobile, it may reduce the electrical charge available to recharge the battery.

Figure 7:
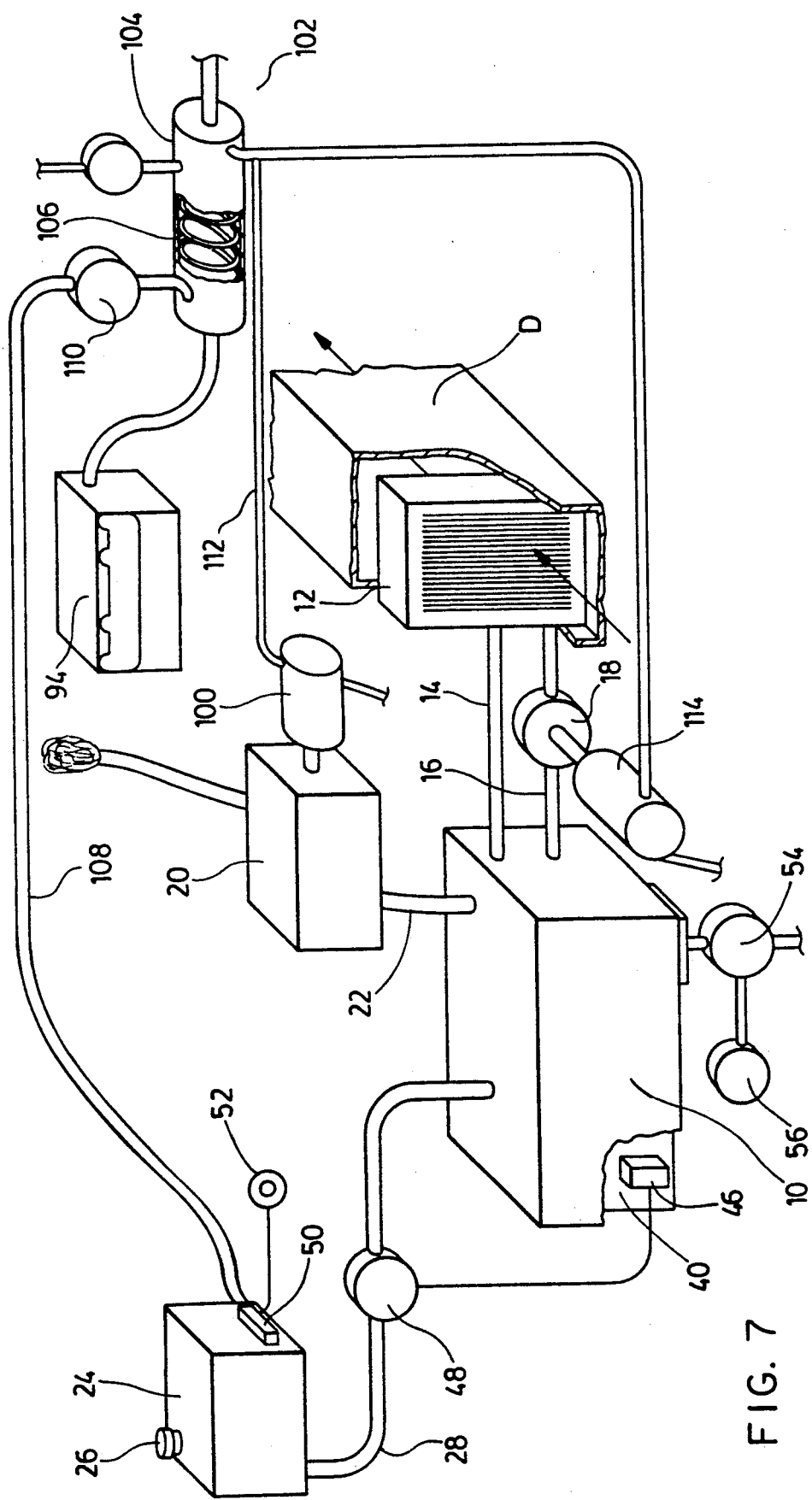

Accordingly, in accordance with the further embodiment of the invention as illustrated in FIG. 7, the vacuum source, i.e. a pump, may in turn be operated by a pressurised vapour driven rotor 100 such as a turbine or the like. The rotor 100 consists a plurality of blade elements (not shown) in a housing, such as is well known in the turbine art and requires no special description.

Vapour for example steam required for the operation of such a turbine will not be required to be at any substantially elevated pressure, since the power requirements of the typical vacuum pump for this purpose are relatively modest. As a result, the required pressurized vapour can readily be generated from waste heat, for example heat available directly from an internal combustion engine, in a vehicle mounted unit.

For this purpose, a heat exchanger 102, consisting of a outer sleeve 104, enclosing a generally spiral fin 106 may be provided. The sleeve 104 and fin 106 are such that they may be placed over a portion of the vehicle exhaust pipe P or catalytic converter. Alternatively, it may be connected in circuit with the vehicle coolant circulation system (not shown) circulating coolant through the radiator (not shown) and the engine 94. In either case, there will usually be adequate waste heat available to generate steam at a sufficient pressure and in a sufficient volume to operate a turbine rotor 100 to drive the vacuum pump 20.

In order to supply liquid, for example water to such a heat exchanger 102, for conversion into pressurized vapour for example steam, a water supply pipe 108 may be provided connected e.g. to water tank 24 via valve 110. A pipe 112 may be connected from the heat exchanger to the rotor 100, and from there it may be vented to atmosphere. Alternatively such steam may be returned back to the radiator condenser in the FIG. 3 embodiment, or alternatively, again, such steam could be vented back into the inlet manifold of the vehicle.

A relief valve R is provided on the heat exchanger 102 to avoid overpressure.

In this way, the power required for the operation of the vacuum does not place any load whatever on the internal combustion engine itself. In fact, by using waste heat from the internal combustion engine, it reduces the stresses on the vehicle radiator and cooling system or exhaust system which are otherwise subjected to maximum stresses during the hot weather when air conditioning is required. In cooler weather when air conditioning is not required, then such cooling system is simply shut down so that the engine system may operate at its optimum designed temperature.

It will also be appreciated that given a sufficient ability to generate pressurized vapour for example steam, the pump 18 for circulating the heat exchange may also be driven by a rotor 114, so that the entire system may be operated without placing any load whatever on the engine itself. Otherwise of course such a pump 18 will be operated either by a fan belt (not shown) or an electrical motor or the like such as is well known in the art.

Further rotors (not shown) similar to rotor 116 could also be used to harness excess energy from waste heat, not required for the vacuum pump, for other purposes. Such purposes could include generation of electrical power, or vacuum or hydraulic servo power for other systems.

The foregoing is a description of a preferred embodiment of the invention which is given here by way of example only. The invention which is not to be taken as limited to any of the specific features as described, but comprehends all such variations thereof as come within the scope of the appended claims.

What is claimed is:

1. An air cooler system for use in association with an air circulation system and comprising;
   an air circulation heat exchanger adapted to be mounted in said air circulation system for recovering heat from said system;
   vacuum chamber means;
   a vacuum chamber heat exchanger comprising a plurality of generally parallel spaced horizontal radiator tubes extending between first and second header tank means and heat exchange fins mounted on said tubes located within said vacuum chamber means and in fluid communication with said air circulation heat exchanger means;
   a water supply tank, and means connecting said water supply tank to said vacuum chamber means;
   fluid circulation means for circulating heat exchange fluid from said air circulation heat exchanger to one of said first and second header tank means and back again from the other of said header tank means whereby to transfer heat from said air circulation heat exchanger to said tubes of said vacuum chamber heat exchanger;
   a belt formed of a liquid evaporation media placed around said vacuum chamber radiator tubes and fins and extending from a lower region to an upper region of said vacuum chamber means, said belt in said lower region being normally immersed in water, and said belt in said upper region being normally above said water whereby water within said lower region of said chamber may permeate said media, and substantially surround at least a portion of said radiator tubes and fins;
   water distributor means in an upper region of said chamber above said belt for distributing water within said vacuum chamber means, for wetting said liquid evaporation belt in said upper region of said chamber;
   sensing means for sensing a predetermined level of water in said vacuum chamber means;
   control means for controlling flow of water from said water supply tank through said water distribution means in said upper region of said vacuum chamber means, whereby to maintain said predetermined level of water therein, exposing a portion of said evaporation belt above said predetermined level;
   vacuum source means, adapted to operate to draw a predetermined degree of vacuum in said vacuum chamber means, whereby to effectively reduce the boiling point of water therein, and, whereby water may be continuously vaporised from said belt of evaporation media, above said water level, thereby drawing water up from said lower region of said chamber means, around said radiator tubes and fins, and cooling the same by extracting the latent heat of vaporisation of water from said fins and tubes.

2. An air cooler system, as claimed in claim 1 and including thermal insulation means, around said vacuum chamber means.

3. An air cooler system, as claimed in claim 1 and including drain valve means on said vacuum chamber means for draining said system of water, and thermally sensitive means for controlling said drain valve means, whereby to drain said system of water when a predetermined reduced temperature is reached, said predetermined temperature being above the freezing temperature of water.

4. An air cooler system as claimed in claim 1 and wherein said vacuum source is selected from one of a vacuum pump, and the inlet manifold of an internal combustion engine.

5. An air cooler system as claimed in claim 1 wherein said evaporative liquid is distributed over said tubes for evaporation thereon.

* * * * *